United States Patent [19]

Dolan

[11] Patent Number: 4,601,739
[45] Date of Patent: Jul. 22, 1986

[54] PROCESS FOR FRACTIONAL DISTILLATION

[75] Inventor: Michael J. Dolan, Brecksville, Ohio

[73] Assignee: Norton Company, Worcester, Mass.

[21] Appl. No.: 645,658

[22] Filed: Aug. 30, 1984

[51] Int. Cl.⁴ .............................. B01D 3/34; F25J 3/02
[52] U.S. Cl. ........................................ 62/20; 203/70; 208/348; 585/867
[58] Field of Search ................. 62/17, 20, 42; 203/70; 208/337, 351, 348; 585/800, 867

[56] References Cited

U.S. PATENT DOCUMENTS

| | | | |
|---|---|---|---|
| 2,577,617 | 12/1951 | Hudig | 62/20 |
| 3,262,278 | 7/1966 | Thorsten et al. | 62/20 |
| 3,756,036 | 9/1973 | Ezell | 62/20 |
| 4,444,576 | 4/1984 | Ryan et al. | 62/20 |

Primary Examiner—Frank Sever
Attorney, Agent, or Firm—Frank S. Chow

[57] ABSTRACT

Existing fractional distillation columns, especially those in extensive commercial use for separating the lower molecular weight hydrocarbons, are often limited in the quality of separation achievable by the heat-absorbing capacity of and/or the minimum operating temperature of their associated refrigeration equipment. The separation efficiency of such equipment can be improved by introducing an auxiliary material into the equipment to provide additional reflux volume without the need for added refrigeration capacity. The auxiliary material must be less volatile than the primary constituent(s) of the off-gas from the column, and it advantageously should also be less volatile than the majority of the bottoms stream from the column, in order to facilitate later separation.

11 Claims, 4 Drawing Figures

PROCESS FOR FRACTIONAL DISTILLATION

BACKGROUND OF THE INVENTION

1. Field of the Invention

This invention relates to the operation of fractional distillation columns, which are used on a large scale to separate the constituents of petroleum and of the products from petroleum cracking, among other purposes. This invention is particularly useful in the separation of materials which are gases at ordinary temperatures and pressures and therefore require large refrigeration capacity to maintain adequate reflux levels for proper column operation. The invention is most particularly adapted to improving the operation of demethanizers in typical ethylene production plants or natural gas conditioning plants.

2. Description of the Prior Art

Fractional distillation is a well-known process for separating mixtures of distinct chemical substances into fractions with different relative volatility. The equipment used is commonly called a column; the mixture to be separated, in the usual commercial continuous version of the process, is called a feed stream, which is separated into a most volatile overhead stream, a least volatile bottoms stream, and often into one or more intermediate volatility side streams. The general fractional distillation process is old, so that there are many distillation columns in existence which were built many years or even decades ago. Since the construction of these early columns, improved column packing materials and other operating improvements have made it possible to obtain more effective separations within the same column volume than was originally possible. More effective separation results in delivery of a vapor phase with a lower dew point to the condenser section at the top of the column.

A certain minimum level of total reflux liquid, i.e., liquid flowing down onto the top of the fractionating zone of the column, is required for proper and efficient operation of the column. Normally, this reflux liquid volume is obtained solely by condensing a suitable fraction of the vapor delivered at the top of the column. If the feed stream contains highly volatile compounds, the temperature required to condense the overhead vapors is below that of cooling water or ambient air, even when the column is operated under high pressure. In distillations of this type, which are quite common, the heat of reflux condensation must be removed by a refrigeration system.

The purity of the overhead product delivered from a distillation column depends on the quality of the column itself, including the nature and amount of packing present, and on the amount of reflux provided during operation. Obtaining a higher purity overhead product requires a colder reflux condensation temperature as well as a higher reflux volume. Thus to obtain higher purity of a high volatility overhead product from a column by conventional means, lower temperature refrigerant is usually necessary along with greater total heat removal during operation.

It is relatively inexpensive to fit an old column with new packing or to increase the reflux ratio of operation of an existing column, and both have often been done in practice to achieve greater separation efficiency than was planned or obtained when the column was originally designed. The separation efficiency of an old column can be increased so much by these means that the originally installed refrigeration capacity of the condenser section is inadequate to maintain minimum reflux volume from the lower dew point vapor delivered by the more efficient separation. This result is particularly likely when separating the lightest gases from petroleum, natural gas, or the products of petroleum cracking. It is generally much more expensive to install new refrigeration capacity than to change the reflux ratio or install new packing for an existing distillation column. As a result, actual realization of the improved efficiency theoretically achievable from existing distillation columns has been seriously impeded. Such impediment has been particularly marked in connection with demethanizer units of large scale commercial ethylene production plants.

SUMMARY OF THE INVENTION

It has now been found that the minimum reflux liquid volume and temperature required for proper operation of an efficient fractional distillation column need not be obtained entirely from condensation of the vapor delivered at the top of the fractionation zone of the column. An auxiliary material, less volatile than the primary constituent of the vapor which is delivered from the top of the column, can be input directly, in liquid phase to the reflux stream, in vapor phase to the stream of vapor entering the condenser section of the column, or in both phases if desired.

Direct introduction of the auxiliary material in liquid phase makes it possible to operate with no condensation section at all in the fractionating unit. However, because most existing fractionating units have some condensation capacity already available, introduction of the auxiliary material in vapor phase is often more convenient and economical.

DESCRIPTION OF THE PREFERRED EMBODIMENTS

The invention is particularly preferred for use in the demethanizer section of an ethylene production plant. In such a plant, petroleum, natural gas, or some other source of hydrocarbons is exposed to high temperature and catalytic surfaces in order to produce a mixture of mostly lower alkanes and alkenes. The first step in separation of this mixture is the demethanizer distillation column, in which methane, the most volatile of all hydrocarbons, is separated from ethylene and all other hydrocarbons with higher boiling points. The reflux condenser of a demethanizer is chilled by a refrigerant, typically ethylene.

Figure 1:
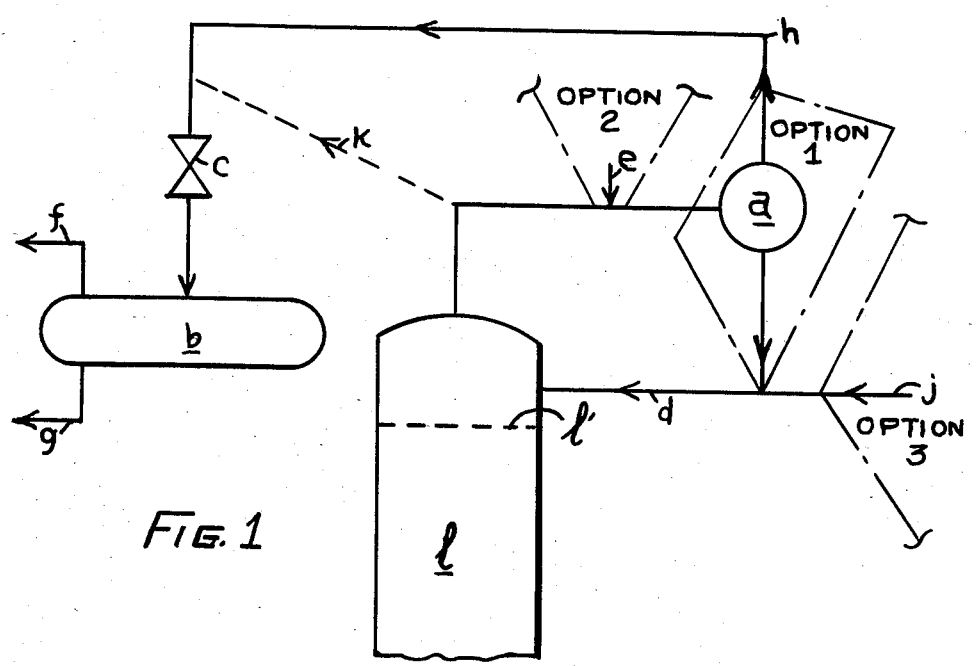
FIG. 1 shows the flow diagram of basic operation of the invention, with three optional configurations. If option 2 is used, option 1 must also be present for proper operation.

The operation of a conventional demethanizer may be described with the aid of FIG. 1, which for this purpose should be imagined to contain only option 1 of the three optional sections shown. A pressurized and liquefied mixture of methane with most of the possible $C_2$ and $C_3$ hydrocarbons and with minor amounts of other constituents is delivered to the middle of fractional distillation column 1 via a feed input not shown. The portion of the column between the point of introduction of the feed and the dotted line m shown on the Figure is filled with suitable packing, bubble cap plates, or other devices known in the art for achieving efficient separations, equivalent to many theoretical stages of simple distillation. The portion of the column provided with such devices is called the fractionation zone. A methane-enriched primarily vapor phase, which may also contain some entrained liquid, is delivered from the top of column 1 to condenser a. Condenser a is provided with surfaces chilled with a refrigerant stream not shown. Contact of the vapor with these surfaces causes some of the vapor to condense, forming a liquid phase stream which exists from the bottom of the condenser and returns to column 1, at a point above the top of the fractionation zone, as a reflux stream through the pipe marked d. The remainder of the vapor originally delivered from the column exits the condenser at the top and passes through a pressure reduction valve c to a condensate drum b. The cooling effect of expansion of the vapor cause some of the vapor to condense to a liquid phase collected in pipe g from the bottom of the condensate drum; this material is recycled to the input of the demethanizer. The final overhead product passes from the condensate drum through overhead pipe f.

The demethanizer column should produce an overhead product containing as little ethylene as possible, as ethylene loss to the overhead represents severe economic loss. Any ethylene losses to the overhead product can in principle be reduced or nearly eliminated by providing more reflux to the demethanizer column or by improving the column itself. However, the practicable extent of the improvement available is often limited by a fixed refrigerant temperature from an ethylene refrigerant, lack of adequate refrigerant volume, or both.

These limitations can be remedied directly according to the practice of my invention as illustrated by options 2 and/or 3 of FIG. 1. Option 2 illustrates the addition of an auxiliary material at point e to the input flow to the condenser a. The auxiliary material may be introduced at this point in either liquid or gas phase. Option 3 illustrates the addition of the auxiliary material at point j into the primarily liquid stream flowing from the bottom of the condenser back toward the column. (When option 3 is used, it is possible, although not necessary, to eliminate the condenser of option 1 entirely. Vapor then passes from the top of the column through pipe k.) Because the auxiliary material is more readily condensable than the vapor from the fractionation zone of the column, its addition increases the volume of reflux liquid at constant condensation capacity and/or constant refrigerant temperature.

When the fractionator (an equivalent term for fractional distillation column) is specifically a demethanizer for an ethylene plant, the auxiliary material preferably should be one which condenses more easily than both methane and ethylene. Reflux volume could be maintained adequately by introducing any material which condenses more easily than methane, but the material introduced will eventually be introduced into the entire product stream from the bottom of the demethanizer. Choosing a material which condenses more easily than ethylene makes the later stages of separation in other parts of the total operation easier. The most preferred auxiliary material is normally ethane, because a stream of gas consisting principally of ethane is normally available economically on site in most ethylene plants from the bottoms of the $C_2$ splitter, another fractionator, in which ethylene is separated from the other gases present in the bottoms from the demethanizer. Alternative auxiliary materials for use in ethylene plant demethanizers are propane or other heavier molecular weight hydrocarbons.

Figure 2:
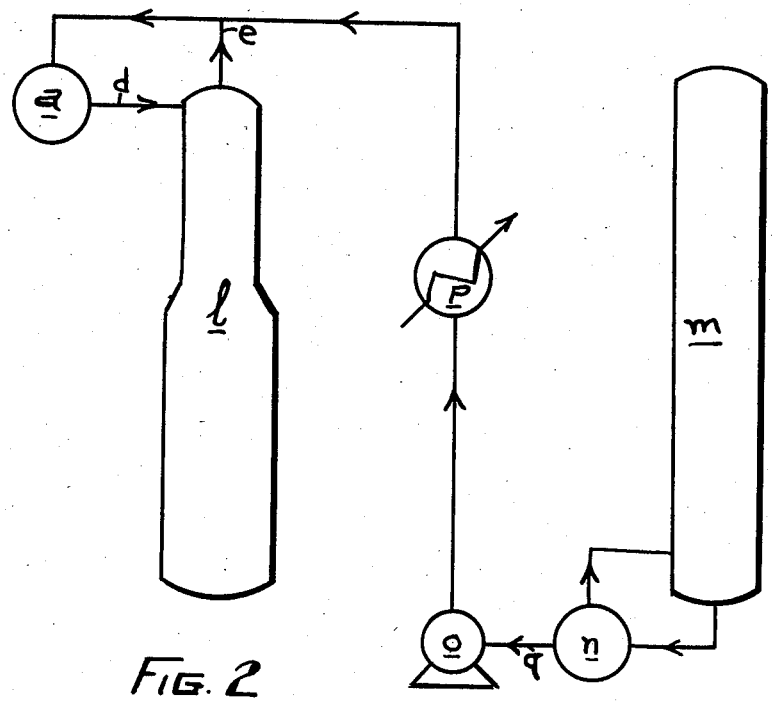
FIGS. 2 and 3 show particular applications of the invention which are especially suited to the operating conditions of most commercial plants for the production of ethylene.

The usually most preferred mode of operation is illustrated in FIG. 2, in which items a, d, e, and 1 have the same function as in FIG. 1. A sidestream output from the reboiler n of a conventional $C_2$ splitter m is directed through pipe q to a pump o, which forces it through an optional cooler p into the stream of vapor entering condenser a of the demethanizer. By this means, it has been found possible to reduce ethylene losses in the overhead fraction from the demethanizer unit to one-tenth of the amount observed before the use of an auxiliary gas stream according to this invention, without lowering the temperature of condensation in the condenser.

Figure 3:
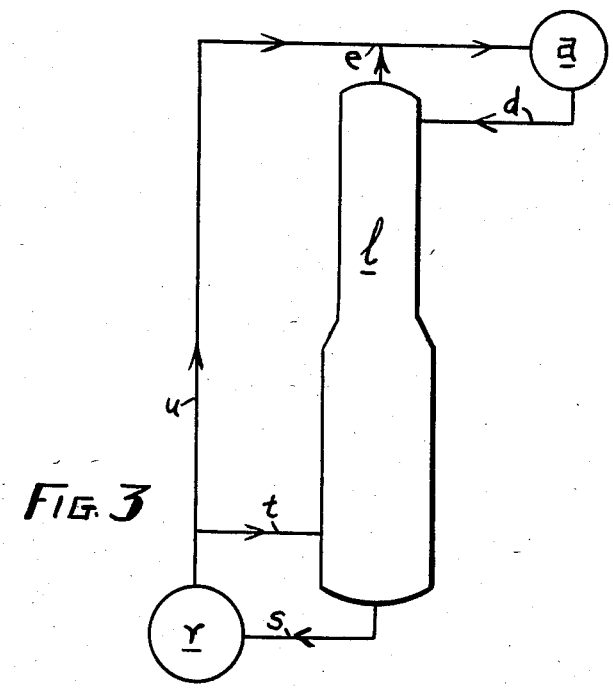

In many ethylene plants, the demethanizer is fitted with a reboiler section, through which a side stream of the liquid bottoms from the demethanizer is circulated and heated. Another suitable source of auxiliary vapor for use in this invention is the vapor phase from this reboiler. Operation according to this embodiment is shown schematically in FIG. 3 of the drawings. Liquid bottoms from the column are circulated through pipe s from the bottom of the demethanizer column into reboiler r. Heating means in r cause a portion of this liquid to vaporize; the vapor passes in part back to the demethanizer fractionation zone through pipe t and in part to the condenser a through pipe u. By this means, a reduction of half the ethylene losses experienced in a particular demethanizer before provision for auxiliary gas introduction has been achieved.

Any convenient source of liquid ethane, or similar hydrocarbons, could be used for operation of the invention according to the direct mode illustrated by option 3 of FIG. 1. If a sufficient amount of such liquid is supplied, operation without any condenser at all is possible.

This invention is particularly suited to the operation of highly efficient fractionating columns, with separations equivalent to those that would be obtained with at least 30 theoretical stages of simple distillation.

The practice of my invention may be further illustrated by the following specific examples.

EXAMPLE 1

A commercial olefins plant demethanizer, with a fractionation zone having 38 theoretical stages, when conventionally operated separated its input feed streams into 454 kilogram-moles per hour (kg-m/hr) of off-gas overhead stream having 1.65 mole % ethylene and 2234 kg-m/hr of bottoms having 900 parts per million (ppm) of methane. The reflux volume of this column under such operating conditions was 363 kg-m/hr. The refrigeration system of this fractionator has a minimum operating temperature of $-95°$ C. Although the refrigeration system has a theoretical capacity to cool more than 363 kg-m/hr of reflux liquid, any attempt to increase the reflux ratio causes the temperature of the reflux liquid to fall because of the lessened amounts of ethylene in the vapor delivered to the condenser. Therefore, in conventional practice, the reflux volume could not be increased and the ethylene loss could not be reduced.

When 39 kg-m/hr of auxiliary ethane was introduced into the overhead line of the demethanizer described here (at the point marked e in FIGS. 1 or 2), the amount of reflux at the same reflux temperature as before was increased to 474 kg-m/hr, and the overhead off-gas contained only 0.24 mole % ethylene, along with 0.95 mole % ethane. Thus, about 85% of the ethylene formerly lost was retained. The bottoms composition remained at 900 ppm of methane.

EXAMPLE 2

The same demethanizer as for Example 1 was used, but 39 kg-m/hr of propane rather than ethane was introduced as the auxiliary material according to my invention. At the same reflux temperature as before, 409 kg-m/hr of reflux was generated, and the off-gas contained 0.46 mole % ethylene and 0.13 mole % propane.

EXAMPLE 3

Figure 4:
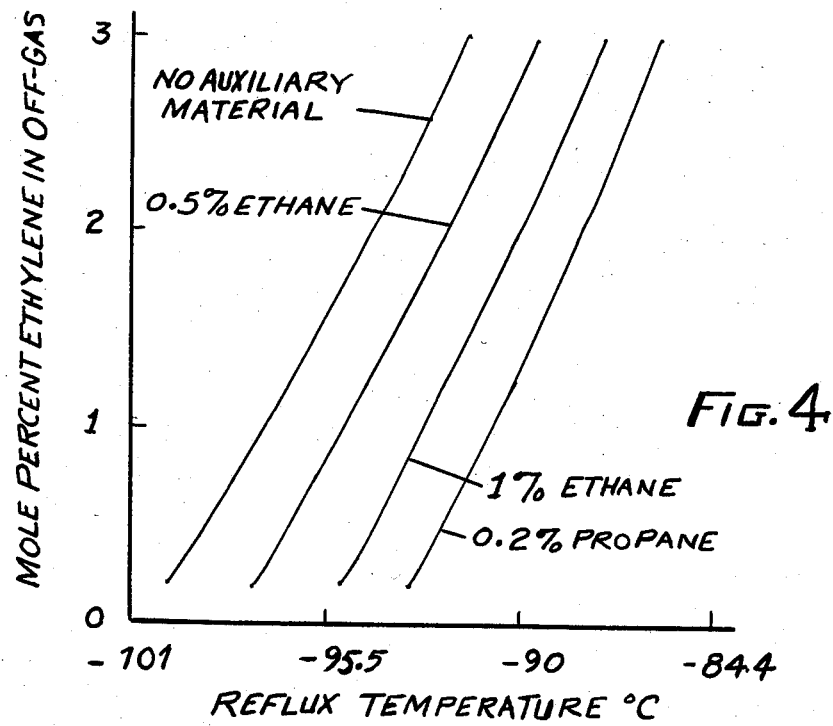
FIG. 4 shows graphically the degree of improvement which can be obtained under certain conditions of application of this invention to demethanizers.

A variety of other possible operating conditions are shown graphically in FIG. 4 of the drawings. These graphs apply to a column operated at 3 megapascals pressure and a consistent input feed from a commercial ethylene plant. The line labelled "No Auxiliary Material" on this Figure represents conventional operation. The other lines represent operation according to my invention, with sufficient introduction of ethane or propane to give the values shown on the Figure for the mole percentage of one of these auxiliary materials in the overhead off-gas. It is clear from comparison of the four graphs on the Figure that very large ethylene loss reductions can be achieved by the use of auxiliary materials according to my invention.

I claim:

1. In a process for the efficient continuous separation of a more volatile constituent A from at least one less volatile constituent B with which it is mixed, said process comprising:
   (a) introducing a liquid mixture comprising components A and B into the central section of a continuous fractional distillation column;
   (b) supplying sufficient heat to the bottom section of said fractional distillation column to generate at the top section of said fractional distillation column a gaseous mixture in which the ratio of the content of component A to the content of component B is greater than in the said liquid mixture of part (a);
   (c) contacting said gaseous mixture of part (b) with condenser surfaces maintained, by refrigeration means capable of supplying refrigerant only at temperatures higher than the temperature required to condense the entire volume of said gaseous mixture of part (b), at a temperature sufficiently low so as to cause the condensation of at least part of said gaseous mixture;
   (d) returning as liquid reflux to the top section of said fractional distillation column the condensate liquid produced by the operation of part (c); and
   (e) separately collecting as outputs (i) the off-gas remaining uncondensed after the operation of part (c) and (ii) liquid from the bottom section of said fractional distillation column in amounts together sufficient in mass to equal the mass of liquid input by operation of part (a), the improvement of precluding the requirement to install new refrigeration capacity due to fitting said continuous fractional distillation column with new packing or increasing the reflux ratio of operation of said column, said improvement comprising:
   (f) admixing with the liquid reflux of part (d) an auxiliary material C independent of the input of part (a) and having a higher condensation temperature than said component A; and
   (g) collecting gas and liquid outputs as recited in part (e) in amounts together sufficient in mass to equal the sum of the input mass of part (a) and the mass of admixed component C, whereby the fraction of component B in the output gas of part (e) is less at any given temperature of condenser surfaces than would be obtained from the same input liquid composition with said fractional distillation column in the absence of an admixing of auxiliary material.

2. A process according to claim 1, wherein part (f) is accomplished by admixing component C in vapor form with said gaseous mixture of part (b) before contacting said gaseous mixture with said condenser surfaces.

3. A process according to claim 2, wherein said component A is methane.

4. A process according to claim 3, wherein said component B is ethylene.

5. A process according to claim 4, wherein at least half of said component C is ethane.

6. A process according to claim 5, wherein the volume of ethane added is sufficient so that the mole percent of ethylene in the off gas is reduced by at least 0.7 mole percent below the value it would have at the same temperature of operation with the same feed gas without the use of an auxiliary material.

7. A process according to claim 6, wherein the volume of ethane added is sufficient so that the mole percent of ethylene in the off-gas is reduced by at least 1.3 mole percent below the value it would have at the same reflux temperature with the same feed gas without the use of an auxiliary material.

8. A process according to claim 4, wherein at least half of said component C is propane.

9. A process according to claim 8, wherein the volume of ethane added is sufficient so that the mole percent of ethylene in the off gas is reduced by at least 2.4 mole percent below the value it would have at the same reflux temperature with the same feed gas without the use of an auxiliary material.

10. A process according to claim 2, wherein said component C is the vapor phase formed by boiling a side stream from the liquid bottoms of the fractional distillation column.

11. A process according to claim 10, wherein part (f) is accomplished by admixing component C in liquid form with said liquid reflux.

* * * * *